United States Patent
Liu

(10) Patent No.: US 11,140,671 B2
(45) Date of Patent: Oct. 5, 2021

(54) SIGNALING SENDING METHOD, APPARATUS, AND SYSTEM

(71) Applicant: HUAWEI TECHNOLOGIES CO., LTD., Guangdong (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 16/580,691

(22) Filed: Sep. 24, 2019

(65) Prior Publication Data

US 2020/0022120 A1 Jan. 16, 2020

Related U.S. Application Data

(63) Continuation of application No. PCT/CN2018/080401, filed on Mar. 24, 2018.

(30) Foreign Application Priority Data

Mar. 25, 2017 (CN) .......................... 201710185309.6

(51) Int. Cl.
*H04W 4/00* (2018.01)
*H04W 72/04* (2009.01)
(Continued)

(52) U.S. Cl.
CPC ........ *H04W 72/042* (2013.01); *H04B 7/0456* (2013.01); *H04B 7/0608* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2009/0262695 A1* 10/2009 Chen .................... H04B 7/0456
370/329
2013/0202057 A1 8/2013 Chen et al.
(Continued)

FOREIGN PATENT DOCUMENTS

CN 101222300 A 7/2008
CN 101227249 A 7/2008
(Continued)

OTHER PUBLICATIONS

Ran Jing, "The Key Techniques of MIMO Research in Wireless Communication Systems," Beijing University of Posts and Telecommunications, May 2015, 1 page (with English abstract).
(Continued)

*Primary Examiner* — Clemence S Han
(74) *Attorney, Agent, or Firm* — Fish & Richardson P.C.

(57) ABSTRACT

The present disclosure relates to signaling transmission methods. In one example method, a base station receives an uplink reference signal sent by user equipment (UE). The base station determines a quantity of antenna ports, where the quantity of antenna ports is a quantity of antenna ports used by the UE to send the uplink reference signal. The base station determines frequency domain resource information based on the quantity of antenna ports, where the frequency domain resource information indicates at least one of a quantity of sub-bands or a sub-band bandwidth. The base station determines a precoding matrix indicator (PMI) of each sub-band based on the frequency domain resource information. The base station sends the PMI of the sub-band to the UE.

20 Claims, 6 Drawing Sheets

(51) Int. Cl.
*H04B 7/0456* (2017.01)
*H04B 7/06* (2006.01)

(56) References Cited

U.S. PATENT DOCUMENTS

| | | | |
|---|---|---|---|
| 2016/0020846 A1 | 1/2016 | Wang et al. | |
| 2016/0249250 A1* | 8/2016 | Kim | H04L 5/0073 |
| 2019/0074884 A1* | 3/2019 | Chen | H04B 7/0632 |
| 2019/0199553 A1* | 6/2019 | Park | H04B 7/0617 |
| 2019/0342768 A1* | 11/2019 | Xu | H04B 7/0639 |
| 2020/0403669 A1* | 12/2020 | Park | H04B 7/0486 |

FOREIGN PATENT DOCUMENTS

| | | |
|---|---|---|
| CN | 101296207 A | 10/2008 |
| CN | 101674655 A | 3/2010 |
| CN | 101785192 A | 7/2010 |
| CN | 101860424 A | 10/2010 |
| CN | 104303431 A | 1/2015 |
| CN | 106165318 A | 11/2016 |
| EP | 2426831 A1 | 3/2012 |
| EP | 2942880 A1 | 11/2015 |
| WO | 2014169421 A1 | 10/2014 |

OTHER PUBLICATIONS

Office Action issued in Chinese Application No. 201710185309.6 dated Sep. 2, 2020, 14 pages (with English translation).

Huawei et al., "Discussion on codebook based UL MIMO transmission" 3GPP DRAFT, R1-1703338, Feb. 12, 2017, 4 pages.

Huawei et al., "Discussion on UL MIMO transmission" 3GPP DRAFT, R1-1611235, Nov. 5, 2016, 8 pages.

PCT International Search Report and Written Opinion in International Application No. PCT/CN2018/080,401, dated Jun. 16, 2018, 17 pages (With English Translation).

Extended European Search Report issued in European Application No. 18776500.3 dated Jan. 30, 2020, 8 pages.

* cited by examiner

SIGNALING SENDING METHOD, APPARATUS, AND SYSTEM

CROSS-REFERENCE TO RELATED APPLICATIONS

This application is a continuation of International Application No. PCT/CN2018/080401, filed on Mar. 24, 2018, which claims priority to Chinese Patent Application No. 201710185309.6, filed on Mar. 25, 2017. The disclosures of the aforementioned applications are hereby incorporated by reference in their entireties.

TECHNICAL FIELD

The present invention relates to the communications field, and in particular, to a precoding information sending technology.

BACKGROUND

Usually, a signal transmission model of a wireless communications system may be based on the following mathematical formula:

$$y = HWx + n$$

x represents a to-be-transmitted signal, H represents a channel matrix used to indicate a characteristic of a channel, and W is a precoding matrix used to indicate a precoding matrix for precoding the to-be-transmitted data before the to-be-transmitted data is transmitted through the channel H. n represents a noise, and y represents a signal received on a receiving side. The precoding matrix W is usually determined through measurement. For example, in a process of determining a precoding matrix of uplink data, a transmit end sends one or more reference signals, a receive end measures the reference signal, and the receive end determines one or more optimal precoding matrices based on a measurement result of the reference signal. The receive end may send a precoding matrix indicator PMI to the transmit end based on the measurement result. In some cases, the PMI may alternatively be not determined based on the measurement result. For example, a network element of a core network configures or another network device directly notifies the PMI sent by the receive end.

Usually, in a process of sending uplink precoding, a manner in which a base station indicates a PMI to UE is a form of corresponding to different PMIs through different sub-bands. For example, a default scheduling bandwidth includes at least one sub-band, where each sub-band is associated with a PMI, and the base station needs to determine the PMI of the sub-band, and notifies the UE of the PMI.

A current manner of notifying PMIs of a plurality of sub-bands is usually: After the PMIs are determined, a PMI of each of the plurality of sub-bands is sent to UE directly through single signaling such as downlink DCI signaling. A scheduling bandwidth of the UE is indeterminate at each time of scheduling. Therefore, if a size of the sub-band is fixed but a size of a scheduling resource is indeterminate, the UE indicates a different quantity of sub-band PMIs through the DCI signaling. As a result, complexity of blind detection is quite high when the UE performs search in the downlink signaling in a blind detection form, and such a manner is insufficiently efficient, and occupies a large quantity of air interface resources.

SUMMARY

Embodiments of the present invention provide a signaling transmission method, an apparatus, and a system, to improve transmission efficiency and save air interface resources.

According to a first aspect, an embodiment of the present invention provides a signaling transmission method. A base station receives an uplink reference signal sent by user equipment UE; the base station determines a quantity of antenna ports, where the quantity of antenna ports is a quantity of antenna ports used by the UE to send the uplink reference signal; the base station determines frequency domain resource information based on the quantity of antenna ports, where the frequency domain resource information indicates at least one of a quantity of sub-bands and a sub-band bandwidth; the base station determines a precoding matrix indicator PMI of each sub-band based on the frequency domain resource information; and the base station sends the PMI of the sub-band to the user equipment UE.

In a first possible implementation of the first aspect, the base station determines codebook information based on the quantity of antenna ports, where the codebook information is at least one of a quantity of code words, a quantity of bits occupied by the PMI of the sub-band, and a codebook, and the codebook is associated with the quantity of antenna ports; and the determining, by the base station, a precoding matrix indicator PMI of each sub-band based on the frequency domain resource information includes: determining, by the base station, the precoding matrix indicator PMI of the sub-band based on the frequency domain resource information and the codebook information.

With reference to the first possible implementation of the first aspect, in a second possible implementation, the determining, by the base station, codebook information based on the quantity of antenna ports includes: determining, by the base station, the frequency domain resource information based on a mapping relationship between the quantity of antenna ports and the codebook information. In a third possible implementation of the first aspect, the sending, by the base station, the PMI of the sub-band to the UE includes: determining, by the base station, bits occupied by PMIs of all of the sub-bands, where when quantities of antenna ports are different, quantities of the occupied bits are the same; and sending, by the base station, the PMI of the sub-band to the UE based on the occupied bits.

With reference to the first aspect or any one of the first to the third possible implementations of the first aspect, in a fourth possible implementation, the sending, by the base station, the PMI of the sub-band to the UE includes: sending, by the base station, at least two pieces of signaling to the UE at different moments, where each piece of signaling includes a PMI of at least one sub-band, and the base station sends the PMI of the sub-band to the UE through the at least two pieces of signaling.

With reference to the fourth possible implementation of the first aspect, in a fifth possible implementation, the base station determines a time interval, and the base station sends the at least two pieces of signaling within the time interval. With reference to the fifth possible implementation of the first aspect, in a sixth possible implementation, the base station sends a time interval indication to the UE, where the time interval indication is used to indicate the time interval.

With reference to the first aspect or any one of the first to the sixth possible implementations of the first aspect, in a seventh possible implementation, the determining, by the base station, frequency domain resource information based on the quantity of antenna ports includes: determining, by the base station, the frequency domain resource information based on a mapping relationship between the quantity of antenna ports and the frequency domain resource information.

According to a second aspect, an embodiment of the present invention provides a signaling transmission method, including: determining, by user equipment UE, a quantity of antenna ports, where the quantity of antenna ports is a quantity of antenna ports used by the UE to send an uplink reference signal; determining, by the UE, frequency domain resource information based on the quantity of antenna ports, where the frequency domain resource information indicates at least one of a quantity of sub-bands and a sub-band bandwidth; sending, by the UE, the uplink reference signal to a base station based on the quantity of antenna ports; receiving, by the UE, downlink control information sent by the base station; and determining, by the UE, a precoding matrix indicator PMI of each sub-band based on the downlink control information and the frequency domain resource information.

In a first possible implementation of the second aspect, the UE determines codebook information based on the quantity of antenna ports, where the codebook information is at least one of a quantity of code words, a quantity of bits occupied by the PMI of the sub-band, and a codebook, and the codebook is associated with the quantity of antenna ports; and the UE determines a precoding matrix of the sub-band based on the codebook information and the PMI of the sub-band.

With reference to the first possible implementation of the second aspect, in a second possible implementation, the determining, by the UE, codebook information based on the quantity of antenna ports includes: determining, by the UE, the frequency domain resource information based on a mapping relationship between the quantity of antenna ports and the codebook information.

In a third possible implementation of the second aspect, the receiving, by the UE, downlink control information sent by the base station includes: determining, by the UE, bits occupied by PMIs of the sub-bands, where when quantities of antenna ports are different, quantities of the occupied bits are the same; and receiving, by the UE based on the occupied bits, the downlink control information sent by the base station.

With reference to the second aspect or any one of the first to the third possible implementations of the second aspect, in a fourth possible implementation, the receiving, by the UE, downlink control information sent by the base station includes: receiving, by the UE at different moments, at least two pieces of signaling sent by the base station, where each piece of signaling includes a PMI of at least one sub-band, and the UE obtains the PMI of the sub-band through the at least two pieces of received signaling.

With reference to the fourth possible implementation of the second aspect, in a fifth possible implementation, the UE determines a time interval, and the UE receives the at least two pieces of signaling within the time interval. With reference to the fifth possible implementation of the second aspect, in a sixth possible implementation, the UE receives a time interval indication sent by the base station, where the time interval indication is used to indicate the time interval. With reference to the second aspect or any one of the first to the sixth possible implementations of the second aspect, in a seventh possible implementation, the determining, by the UE, frequency domain resource information based on the quantity of antenna ports includes: determining, by the UE, the frequency domain resource information based on a mapping relationship between the quantity of antenna ports and the frequency domain resource information.

According to a third aspect, an embodiment of the present invention provides a base station, including: a receiving unit, configured to receive an uplink reference signal sent by user equipment UE; a determining unit, configured to determine a quantity of antenna ports, where the quantity of antenna ports is a quantity of antenna ports used by the UE to send the uplink reference signal, where the determining unit is configured to determine frequency domain resource information based on the quantity of antenna ports, where the frequency domain resource information indicates at least one of a quantity of sub-bands and a sub-band bandwidth; and the determining unit is configured to determine, by the base station, a precoding matrix indicator PMI of each sub-band based on the frequency domain resource information; and a sending unit, configured to send the PMI of the sub-band to the user equipment UE.

In a first possible implementation of the third aspect, the determining unit is configured to determine codebook information based on the quantity of antenna ports, where the codebook information is at least one of a quantity of code words, a quantity of bits occupied by the PMI of the sub-band, and a codebook, and the codebook is associated with the quantity of antenna ports; and that the determining unit is configured to determine a precoding matrix indicator PMI of each sub-band based on the sub-band information includes: the determining unit is configured to determine the precoding matrix indicator PMI of the sub-band based on the sub-band information and the codebook information.

With reference to the first possible implementation of the third aspect, in a second possible implementation, that the determining unit is configured to determine codebook information based on the quantity of antenna ports includes: the determining unit is configured to determine the frequency domain resource information based on a mapping relationship between the quantity of antenna ports and the codebook information.

With reference to the second possible implementation of the third aspect, in a third possible implementation, that the sending unit is configured to send the PMI of the sub-band to the UE includes: the determining unit is configured to determine bits occupied by PMIs of all of the sub-bands, where when quantities of antenna ports are different, quantities of the occupied bits are the same; and the sending unit is configured to send the PMI of the sub-band to the UE based on the occupied bits.

With reference to the third aspect or any one of the first to the third possible implementations of the third aspect, in a fourth possible implementation, that the sending unit is configured to send the PMI of the sub-band to the UE includes: the sending unit is configured to send at least two pieces of signaling to the UE at different moments, where each piece of signaling includes a PMI of at least one sub-band, and the sending unit sends the PMI of the sub-band to the UE through the at least two pieces of signaling.

With reference to the fourth possible implementation of the third aspect, in a fifth possible implementation, the determining unit is configured to determine a time interval, and the base station sends the at least two pieces of signaling within the time interval.

With reference to the fourth possible implementation of the third aspect, in a sixth possible implementation, the sending unit is configured to send a time interval indication to the UE, where the time interval indication is used to indicate the time interval.

With reference to the third aspect or any one of the first to the sixth possible implementations of the third aspect, in a seventh possible implementation, that the determining unit is configured to determine frequency domain resource information based on the quantity of antenna ports includes: the determining unit is configured to determine the frequency domain resource information based on a mapping relationship between the quantity of antenna ports and the frequency domain resource information.

According to a fourth aspect, an embodiment of the present invention provides user equipment UE, including: a determining unit, configured to determine a quantity of antenna ports, where the quantity of antenna ports is a quantity of antenna ports used by the UE to send an uplink reference signal, where the determining unit is configured to determine frequency domain resource information based on the quantity of antenna ports, where the frequency domain resource information indicates at least one of a quantity of sub-bands and a sub-band bandwidth; a sending unit, configured to send the uplink reference signal to a base station based on the quantity of antenna ports and the frequency domain resource information; and a receiving unit, configured to receive downlink control information sent by the base station, where the determining unit is further configured to determine a precoding matrix indicator PMI of each sub-band based on the downlink control information and the frequency domain resource information.

In a first possible implementation of the fourth aspect, the determining unit is configured to determine codebook information based on the quantity of antenna ports, where the codebook information is at least one of a quantity of code words, a quantity of bits occupied by the PMI of the sub-band, and a codebook, and the codebook is associated with the quantity of antenna ports.

The UE determines a precoding matrix of the sub-band based on the codebook information and the PMI of the sub-band.

With reference to the first possible implementation of the fourth aspect, in a second possible implementation, that the determining unit is configured to determine codebook information based on the quantity of antenna ports includes: the determining unit is configured to determine the frequency domain resource information based on a mapping relationship between the quantity of antenna ports and the codebook information.

In a third possible implementation of the fourth aspect, that the receiving unit is configured to receive downlink control information sent by the base station includes: the determining unit is configured to determine bits occupied by PMIs of the sub-bands, where when quantities of antenna ports are different, quantities of the occupied bits are the same; and the sending unit is configured to receive, based on the occupied bits, the downlink control information sent by the base station.

With reference to the fourth aspect or any one of the first to the third possible implementations of the fourth aspect, in a fourth possible implementation, the receiving, by the UE, downlink control information sent by the base station includes: the receiving unit is configured to receive, at different moments, at least two pieces of signaling sent by the base station, where each piece of signaling includes a PMI of at least one sub-band, and the receiving unit obtains the PMI of the sub-band through the at least two pieces of received signaling.

With reference to the fourth possible implementation of the fourth aspect, in a fifth possible implementation, the determining unit is configured to determine a time interval, and the receiving unit receives the at least two pieces of signaling within the time interval. With reference to the fifth possible implementation of the fourth aspect, in a sixth possible implementation, the receiving unit is configured to receive a time interval indication sent by the base station, where the time interval indication is used to indicate the time interval.

With reference to the fourth aspect or any one of the first to the sixth possible implementations of the fourth aspect, in a seventh possible implementation, that the determining unit is configured to determine frequency domain resource information based on the quantity of antenna ports includes: the determining unit is configured to determine the frequency domain resource information based on a mapping relationship between the quantity of antenna ports and the frequency domain resource information.

The present invention further provides a computer readable storage medium, including an instruction. When the instruction is run on a computer, the computer is enabled to perform each method in the foregoing summary.

Through the foregoing implementations, a problem that efficiency of blind detection of the UE is relatively low when the base station is in uplink transmission mode may be resolved, thereby further improving system efficiency.

DESCRIPTION OF EMBODIMENTS

The network architecture and the service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that with the evolution of the network architecture and the emergence of new service scenarios, the technical solutions provided in the embodiments of the present invention are also applicable to similar technical problems.

Figure 1:
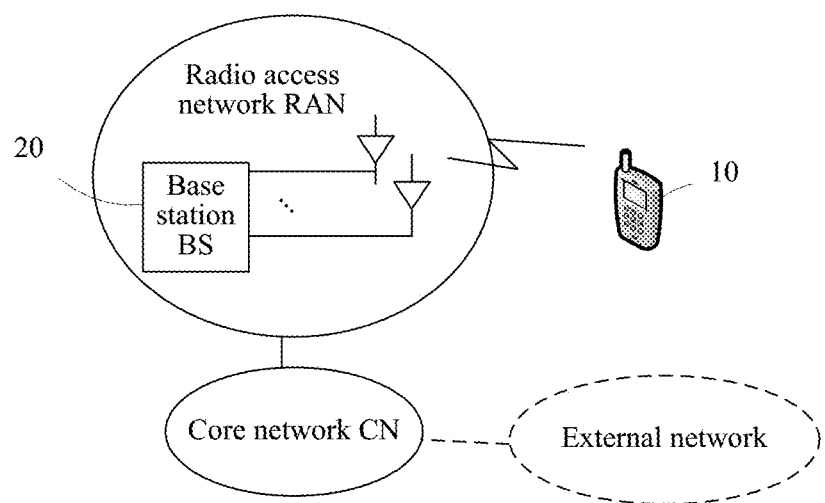
FIG. 1 is a schematic diagram of a system network according to an embodiment of the present invention.

FIG. 1 is a schematic diagram of a possible system network according to the present invention. As shown in FIG. 1, at least one user equipment UE 10 communicates with a radio access network (radio access network, RAN for short). The RAN includes at least one base station 20 (base station, BS for short). Only one base station and one UE are shown in the figure for clarity. The RAN is connected to a core network (core network, CN for short). Optionally, the CN may be coupled to one or more external networks (external network) such as the internet or a public switched telephone network (public switched telephone network, PSTN for short).

For ease of understanding, some terms used in this application are described below.

In this application, terms "network" and "system" are often alternately used, but a person skilled in the art may understand the meaning thereof. User equipment (user equipment, UE for short) is a terminal device having a communication function, and may include a handheld device, an in-vehicle device, a wearable device, or a computing device that has a wireless communication function, another processing device connected to a wireless modem, or the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless telephone set, and a wireless local loop station. For ease of description, the names are briefly referred to as user equipment or UE in this application. The base station (base station, BS for short), also referred to as a base station device, is a device deployed in a radio access network to provide a wireless communication function. The base station may have different names in different wireless access systems. For example, the base station is referred to as a NodeB (NodeB) in a universal mobile telecommunications system (Universal Mobile Telecommunications System, UMTS for short) network, while the base station is referred to as an evolved NodeB (evolved NodeB, eNB or eNodeB for short) in an LTE network.

A system using a multiple-input multiple-output (Multiple Input Multiple Output, MIMO for short) technology sends data or other information by using a plurality of transmit antennas and a plurality of receive antennas, thereby improving a rate of transmitting the data or the other information. When the base station is used as a signal receive end, and the user equipment is used as a transmit end, the UE side needs to obtain channel information. A precoding matrix indicator (precoding matrix indication, PMI for short) may be used as such a type of information, and is sent to the base station device through the user equipment.

The base station may usually determine the PMI by measuring a reference signal. Usually, there are a plurality of reference signals. For example, measurement may be performed by using a channel sounding reference signal (sounding reference signal, SRS for short) such as a demodulation reference signal (Demodulation Reference Signal, DMRS for short), or using another reference signal, another signal, or a combination of various signal types. There may be a plurality of specific measurement processes between the base station and the user terminal, and a manner is a traversal type. For example, the UE determines all possible precoding matrices, precodes a reference signal of a plurality of ports by using these precoding matrices, and sends the precoded reference signal to the base station. The base station receives the reference signal corresponding to these precoding matrices, determines one or more best measurement results by calculating a signal-to-noise ratio or another parameter, determines an index corresponding to the measurement result, and then sends the index and/or a PMI corresponding to the index to the user equipment. It should be understood that, these precoding matrices may correspond to one or more reference signals. Another specific measurement process may be: The UE directly sends a reference signal that is of a plurality of ports and that is not precoded to the base station. The base station performs measurement to obtain channel state information, determines a best precoding matrix with reference to a data transmission solution used subsequently by the UE to send data, and sends an index PMI corresponding to the precoding matrix to the UE.

After receiving the PMI, the UE may determine a precoding matrix of uplink data or a precoding matrix of other uplink information based on the PMI, and specially, may precode downlink data or other uplink information by using the PMI as only a reference or without using the PMI. Usually, whether the UE uses the PMI indicated by the base station may depend on a situation of a system or a scenario. However, before precoding the data or the other uplink information, the UE usually receives the PMI. An objective thereof is to make a reference for the UE to determine a precoding matrix.

It should be understood that, a quantity of the foregoing PMIs may be one or more. For example, in a three-dimensional MIMO (3D-MIMO) double-codebook scenario, a precoding matrix W may be written in the following form:

$$W = W1 \times W2$$

Corresponding to the foregoing formula, a quantity of PMIs is two. PMI1 is associated with W1, and PMI2 is associated with W2. In the embodiments of the present invention, each PMI corresponds to a precoding matrix, and a structure of the precoding matrix may be in a single-codebook form, a double-codebook form, a three-codebook form, or the like. This is not limited herein. Herein, a definition of the single-codebook form is that one precoding matrix functioning during uplink data transmission corresponds to only one precoding matrix indicator, and a definition of the double-codebook form is that one precoding matrix functioning during uplink data transmission corresponds to two precoding matrix indicators. For example, W in the foregoing example corresponds to two precoding matrix indicators PMI1 and PMI2. Similarly, a definition of the three-codebook form is that one precoding matrix functioning during uplink data transmission corresponds to three precoding matrix indicators.

The embodiments of the present invention are applicable to various scenarios in which codebooks are different, and scenarios in which quantities of PMIs are different. Implementations of the present invention are specifically described below with reference to specific examples. In the embodiments of the present invention, the base station may be a network device. It should be understood that, the present invention may also support a device-to-device (Device to Device) scenario. In the scenario, the base station may be user equipment or another type of relay.

A base station receives an uplink reference signal sent by user equipment UE; the base station determines a quantity of antenna ports, where the quantity of antenna ports is a quantity of antenna ports used by the UE to send the uplink reference signal; the base station determines frequency domain resource information based on the quantity of antenna ports, where the frequency domain resource information indicates at least one of a quantity of sub-bands and a sub-band bandwidth; the base station determines a precoding matrix indicator PMI of each sub-band based on the frequency domain resource information; and the base station sends the PMI of the sub-band to the user equipment UE.

On a corresponding UE side, user equipment UE determines a quantity of antenna ports, where the quantity of antenna ports is a quantity of antenna ports used by the UE to send an uplink reference signal; the UE determines frequency domain resource information based on the quantity of antenna ports, where the frequency domain resource information indicates at least one of a quantity of sub-bands and a sub-band bandwidth; the UE sends the uplink reference signal to a base station based on the quantity of antenna ports; the UE receives downlink control information sent by the base station; and the UE determines a precoding matrix indicator PMI of each sub-band based on the downlink control information and the frequency domain resource information.

It should be understood that, in addition to the precoding matrix indicator PMI of the sub-band, the downlink control information further includes resource allocation information sent by the base station to the UE, and the resource allocation information indicates a scheduling resource block of the UE, and specifically includes information such as a size of a frequency domain resource for scheduling the UE or a location of a frequency domain resource block. In the downlink control information, an indication of the frequency domain resource information corresponds to a resource allocation information indication. Specifically, a product of the quantity of sub-bands indicated by the frequency domain resource information and the sub-band bandwidth is equal to a size of the scheduling resource block of the UE in the resource allocation information indication.

In an implementation, the determining, by the UE, frequency domain resource information based on the quantity of antenna ports includes: determining, by the UE, the frequency domain resource information based on the resource allocation information indication in the downlink control information and the quantity of antenna ports.

In an embodiment, different types of uplink reference signals are associated with different quantities of ports. For example, a sounding reference signal (sounding reference signal, SRS for short) may be sent by using 1, 2, 3, 4, 6, or 8 ports, and a demodulation reference signal (demodulation reference signal, DMRS for short) may be sent by using 1, 2, 4, or 8 antenna ports. A quantity of ports that are specifically used for sending may be configured by the base station or determined through information negotiation between both parties. The UE may report capability indication information in advance, so as to indicate a quantity of antenna ports that the UE may support. In an embodiment, before sending a reference signal, the base station notifies the UE of a quantity of antenna ports for the sent reference signal. In another embodiment, the base station determines the quantity of antenna ports directly based on the uplink reference signal.

A sub-band (sub-band) is a part of a frequency domain resource. The sub-band may be a part of frequency band relative to a default bandwidth, or may be a designated frequency range. The sub-band may be measured by using a "part" or "fraction". For example, if the default bandwidth is averagely segmented into a plurality of frequency bands, each sub-band may be referred to as a part of each frequency band obtained through segmentation, or an $N^{th}$ fraction or one of fractions of the default bandwidth. The sub-band may also be calculated and measured in a PRB block form. For example, if one total frequency band includes K PRBs, and the K PRBs are segmented into L fractions, L sub-bands may be obtained. The segmentation is division, and this division manner may be average division. In another case, the concept of the sub-band may be further a designated range and does not need to make a reference to the default bandwidth. For example, starting from an $n^{th}$ MHz, every 20 MHz is referred to as a sub-band. Usually, the default bandwidth may be stipulated between the UE and the base station side, or may be configured by any network element through signaling or determined through negotiation between the UE and the base station. Optionally, the default bandwidth may alternatively be a frequency domain resource scheduled dynamically by the base station or allocated to the UE, and this frequency domain resource may be an entire system bandwidth or some frequency domain resources of a system bandwidth. Moreover, the base station notifies a result of the dynamic scheduling to the UE. A result of each time of scheduling differs. Therefore, the default bandwidth is a dynamically changing frequency band.

Through description of this embodiment, the base station may determine, based on the quantity of antenna ports, a notified quantity of sub-bands or a size of a bandwidth occupied by each sub-band, so as to flexibly determine the quantity of sub-bands and/or the size of the sub-band. For example, when the quantity of antenna ports is increasing, because a quantity of bits required to notify a PMI of each sub-band is relatively large, reduction in the quantity of sub-bands may reduce a total quantity of indication bits of the PMI, thereby improving transmission performance of the downlink control information.

In an embodiment, a total quantity of indication bits of a PMI indicator of the UE on all sub-bands within a scheduling resource may be predefined, and may also be indicated to a user by the base station through higher layer signaling or a MAC CE.

In an embodiment, the base station determines the PMI of the sub-band based on the quantity of antenna ports. After determining the quantity of antenna ports, the base station may measure the uplink reference signal according to a determined measurement rule, and directly determine the PMI of the corresponding sub-band. In this implementation, the base station may not determine the quantity of sub-bands, but directly determine a value of a PMI of which the UE needs to be notified and send the value. The base station may alternatively determine sub-band information based on the quantity of antenna ports and a total quantity of indication bits of a PMI indicator of the UE on all sub-bands within a scheduling resource, and a specific manner of determining the sub-band information may be querying a correspondence table, where the correspondence table includes a relationship between a quantity of antenna ports and a quantity of sub-bands. For example,

| Quantity of antenna ports | Quantity of sub-bands |
| --- | --- |
| 2 | 8 |
| 4 | 4 |
| 8 | 2 |
| 16 | 1 |

Certainly, the correspondence table may alternatively be a relationship between a quantity of antenna ports and a sub-band bandwidth. For example, if the base station determines, based on a quantity of antenna ports, that a sub-band bandwidth is 20 MHz, when a default scheduling bandwidth is 160 MHz, the base station may determine that the quantity of sub-bands is 8. The base station then determines a PMI of each sub-band based on the quantity of sub-bands. In another embodiment, a PRB may be used as a unit of the sub-band bandwidth. For example, if the base station determines, based on the quantity of antenna ports, that the sub-band is 4 PRBs, when a default scheduling bandwidth is 16 PRBs, the base station may determine that the quantity of sub-bands is 4.

In still another embodiment, the base station determines codebook information based on the quantity of antenna ports, where the codebook information is at least one of a quantity of code words, a quantity of bits occupied by the PMI of the sub-band, and a codebook, and the codebook is associated with the quantity of antenna ports; and the determining, by the base station, a precoding matrix indicator PMI of each sub-band based on the codebook information includes: determining, by the base station, the precoding matrix indicator PMI of the sub-band based on the sub-band information and the codebook information.

Similar to the base station, the UE determines codebook information based on the quantity of antenna ports, where the codebook information is at least one of a quantity of code words, a quantity of bits occupied by the PMI of the sub-band, and a codebook, and the codebook is associated with the quantity of antenna ports; and the UE determines a precoding matrix of the sub-band based on the codebook information and the PMI of the sub-band.

When the base station communicates with the UE, only one codebook may be used, or a plurality of codebooks may be used. If one codebook {WA} is used, there may also be usually a solution of notifying one or more PMIs. If one PMI is notified, or both parties determine in advance that the codebook {WA} is used in one time of communication or communication within a time period, the base station may not notify the codebook information because the UE may determine, in advance or based on a predefined rule, a quantity of bits of a PMI of each sub-band indicated by the base station. However, to more precisely indicate and adapt to the quantity of antenna ports, the base station may determine the codebook information based on the quantity of antenna ports, so as to dynamically and flexibly adjust a size of a codebook or a code word to save air interface resources. For example, if a quantity of ports is relatively small, a relatively wide beam is formed correspondingly. This type of beam usually has relatively wide coverage. However, if a quantity of ports is relatively large, a relatively narrow beam is formed correspondingly. This type of beam usually has relatively good directivity, but a relatively accurate transmission direction is required before a good receiving effect can be achieved. Therefore, the case in which a quantity of ports is relatively small has a precision requirement lower than that of the case in which a quantity of ports is relatively large. Therefore, the base station may determine the codebook information based on the quantity of antenna ports. The codebook information may be specifically of a plurality of forms. Different implementations in which the base station determines the codebook information based on the quantity of antenna ports are described below based on different codebook information forms:

Implementation 1

The codebook information is a quantity of code words. If a code word set exists on the base station and/or UE side, and a subset of the code word set forms a codebook, the base station may determine a quantity n of code words based on the quantity of antenna ports. To be specific, n code words are selected from the code word set as a determined codebook. When there are a large quantity of antenna ports, there are a large quantity of code words; or when there are a small quantity of antenna ports, there are a small quantity of code words. In an embodiment, the precoding set is a sub-matrix of a discrete fourier transform (DFT) matrix. A code word may be formed by selecting several columns from the DFT matrix. For example, if the quantity of code words is 16 when the base station and the UE determine that the quantity of antenna ports is 8, 16 combination forms of columns in the DFT matrix may be included in the codebook; and if the quantity of code words is 2 when the base station and the UE determine that the quantity of antenna ports is 2, only two combination forms of columns in the DFT matrix are included in the codebook. In this case, when the base station or the UE may determine that the quantity of code words is 16, the base station needs to occupy 4 bits to send a PMI of a sub-band to the UE because $2^4=16$; and when the base station or the UE may determine that the quantity of code words is 2, the base station needs to occupy 1 bit to send a PMI of a sub-band to the UE because $2^1=2$.

Implementation 2

The codebook information is a quantity of bits occupied by the PMI of the sub-band.

Similar to the implementation 1, the base station may indirectly determine, based on the quantity of antenna ports, the quantity of bits occupied by the PMI, or may determine, directly through table lookup or based on a preset correspondence, the quantity of bits occupied by the PMI.

Implementation 3

The codebook information is the codebook. The determining, by the base station, the codebook information based on the quantity of antenna ports may be determining, by the base station, the codebook based on the quantity of antenna ports. The base station may determine the codebook directly based on the quantity of antenna ports.

There may be many implementations in which the base station determines a precoding matrix indicator PMI of each sub-band based on the sub-band information. Details are not described herein again. The base station may further look up a correspondence table, including a mapping relationship between the port and the codebook information. For example, the mapping relationship is applied to the implementation 2:

| Quantity of antenna ports | Quantity of bits occupied by a PMI |
| --- | --- |
| 2 | 1 |
| 4 | 2 |
| 8 | 4 |
| 16 | 8 |

Alternatively, the mapping relationship is applied to the implementation 3:

| Quantity of antenna ports | Codebook |
|---|---|
| 2 | {W$_2$} |
| 4 | {W$_4$} |
| 8 | {W$_8$} |
| 16 | {W$_{16}$} |

{W$_2$}, {W$_4$}, {W$_8$}, and {W$_{16}$} respectively correspond to cases in which quantities of antenna ports are 2, 4, 6, and 8.

The correspondence table may be further:

| Quantity of antenna ports | Quantity of bits occupied by a PMI of each sub-band | Quantity of sub-bands | Quantity of occupied bits |
|---|---|---|---|
| 2 | 1 | 16 | 16 |
| 4 | 2 | 8 | 16 |
| 8 | 4 | 4 | 16 |
| 16 | 8 | 2 | 16 |

Correspondingly, the UE determines codebook information based on the quantity of antenna ports, where the codebook information is at least one of a quantity of code words, a quantity of bits occupied by the PMI of the sub-band, and a codebook, and the codebook is associated with the quantity of antenna ports; and the UE determines a precoding matrix of the sub-band based on the codebook information and the PMI of the sub-band. In this way, a quantity of blind detection times of the UE may be further reduced.

In still another embodiment, the base station determines bits occupied for sending PMIs of all of the sub-bands, where when quantities of antenna ports are different, quantities of the occupied bits are the same. The base station sends the PMI of the sub-band to the UE based on the occupied bits.

Still another embodiment of the present invention is further described below. It should be understood that, the following embodiments may be independently implemented, or may be performed with reference to the foregoing embodiments.

A base station sends at least two pieces of signaling to the UE at different moments, where each piece of signaling includes a PMI of at least one sub-band, and the base station sends the PMI of the sub-band to the UE through the at least two pieces of signaling. In an embodiment, The UE determines to send a plurality of PMIs in each of the at least two pieces of signaling. For example, a quantity of the sub-bands is K, the base station sends n PMIs in a first piece of signaling at a first moment, and the base station sends m PMIs in a second piece of signaling at a second moment, where then PMIs and the m PMIs include PMIs of the K sub-bands. An advantage of such a practice is that the base station may separately send the PMI of the sub-band in different pieces of signaling at different moments. Compared with a case in which PMI indicators of all K sub-bands are all sent in DCI at one moment, a quantity of bits for sending a PMI indicator at each moment can be reduced, thereby improving transmission performance of a downlink control channel. Certainly, a PMI of each sub-band may be sent by more times. For example, more than two pieces of signaling are used, and the PMI is sent at different moments. It should be understood that, in some cases, two pieces of signaling including PMIs of different sub-bands may alternatively be sent at one moment. Optionally, the base station determines a time interval, and the base station sends the at least two pieces of signaling within the time interval. The base station and/or the UE may determine a time interval, and in a process in which the UE determines a precoding matrix based on a PMI of a sub-band, the UE may determine the precoding matrix based only on a PMI within a time interval. For example, the base station completes sending of a first one of the at least two pieces of signaling to the UE at a moment T$_a$, and the base station completes sending of a last one of the at least two pieces of signaling to the UE at a moment T$_b$, where a difference between the moment T$_b$ and the moment T$_a$ is Δ$_t$. The UE and/or the base station may use a PMI within Δ$_t$ as a valid PMI, and the UE does not reuse the previously sent PMI to determine the precoding matrix. Δ$_t$ may not be measured based on a moment or not use a moment as a unit, and may use a subframe or a timeslot as a unit. For example, Δ$_t$ is a plurality of subframes. T$_b$ may alternatively be a moment at which the UE determines the precoding matrix.

Figure 2:
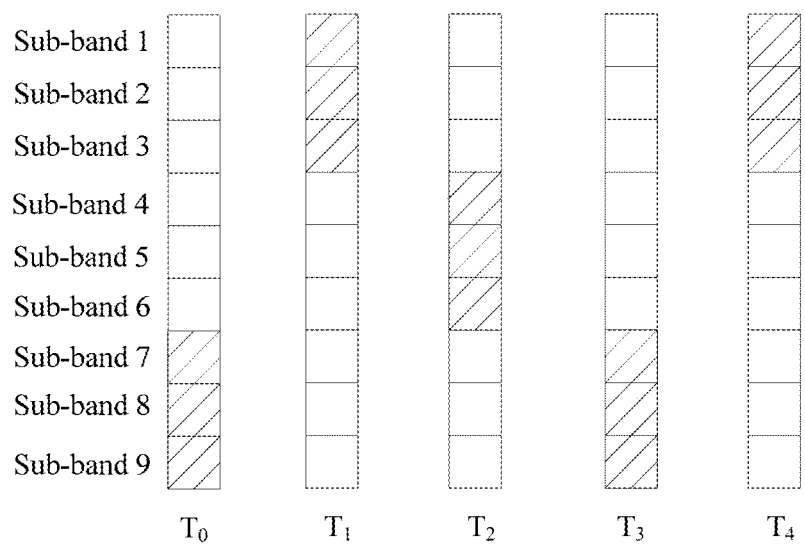
FIG. 2 is a sequence diagram of signaling transmission according to an embodiment of the present invention.
Figure 3:
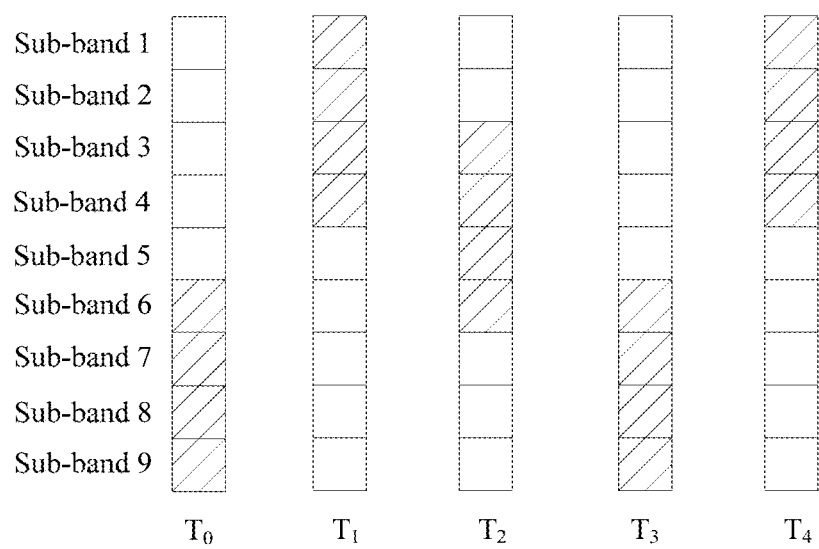
FIG. 3 is a sequence diagram of signaling transmission according to an embodiment of the present invention.

For example, as shown in FIG. 2, in this embodiment, the base station determines that there are PMIs of nine sub-bands in total that are respectively a PMI of a sub-band 1 to a PMI of a sub-band 9, and the base station separately sends the PMIs at four moments T$_0$, T$_1$, T$_2$, and T$_3$, where the base station sends the PMIs of the sub-bands 7, 8, and 9 at the moment T$_0$, the base station sends the PMIs of the sub-bands 1, 2, and 3 at the moment T$_1$, the base station sends the PMIs of the sub-bands 4, 5, and 6 at the moment T$_2$, the base station sends the PMIs of the sub-bands 7, 8, and 9 at the moment T$_3$, and the base station sends the PMIs of the sub-bands 1, 2, and 3 at the moment T$_4$. A time interval from T$_0$ to T$_2$ is Δ$_t$, a time interval from T$_1$ to T$_3$ is Δ$_t$, and a time interval from T$_2$ to T$_4$ is Δ$_t$. Therefore, between the moments T$_2$ and T$_3$, the UE determines the precoding matrix by using the PMIs of the sub-bands 7, 8, and 9 sent at the moment T$_0$, the PMIs of the sub-bands 1, 2, and 3 sent at the moment T$_1$, and the PMIs of the sub-bands 4, 5, and 6 sent at the moment T$_2$; and after the moment T$_3$ and before the moment T$_4$, the UE determines the precoding matrix by using the PMIs of the sub-bands 1, 2, and 3 sent at the moment T$_1$, the PMIs of the sub-bands 4, 5, and 6 sent at the moment T$_2$, and the PMIs of the sub-bands 7, 8, and 9 sent at the moment T$_3$. After the moment T$_3$ and before the moment T$_4$, the PMIs of the sub-bands notified at the moment T$_0$ have been "invalid", and are updated by using the PMIs of the sub-bands sent at the moment T$_3$. An advantage of such a practice is that the base station does not need to perform notifying through one piece of signaling at one moment, thereby saving resources. In still another embodiment, the notifying manner may alternatively be in a form in FIG. 3. To be specific, PMIs between some moments are overlapped. For example, at a moment T$_1$, PMIs notified by the base station are PMIs of sub-bands 1, 2, 3, and 4; and at a moment T$_2$, PMIs notified by the base station are PMIs of sub-bands 2, 3, 4, and 5, where PMI2 and PMI3 are overlapped. In such a case, although overlapping exists in notifying PMIs, reliability is improved, and an update period can be increased on some key sub-bands. In an embodiment, the base station may alternatively determine a PMI that corresponds to a sub-band and that needs to be repeatedly notified, and if notifying fails in the foregoing signaling or update needs to be performed in time, notifying is performed again at a time interval within Δ$_t$.

In an embodiment, the base station sends a time interval indication to the UE, where the time interval indication is used to indicate the time interval. It should be understood that, the time interval and $\Delta_t$ may be defined in a plurality of manners. For example, presumption is performed forward starting from the time at which the UE determines the PMI, or presumption may be performed backward after PMIs of a plurality of sub-bands are received in a subframe. For example, in FIG. 2, the base station sends the PMIs of the sub-bands 4, 5, and 6 at the moment $T_2$. Starting from the moment $T_2$, a plurality of subframes, a plurality of pieces of signaling, or an actual time after the moment $T_2$ is $\Delta_t$, and the base station completes, within the time $\Delta_t$ starting from the moment $T_2$, sending of a PMI of each sub-band once.

The foregoing embodiment corresponds to receiving of the UE. The UE may perform receiving based on a receiving rule or parameter pre-determined through negotiation with the base station, for example, a determined value of $\Delta_t$. Alternatively, the UE and the base station may both use a uniform protocol to implement interconnectivity and intercommunication to achieve the objective of the implementations of the present invention.

Method embodiments and apparatus embodiments of the present invention are provided below with reference to accompanying drawings.

Figure 4:
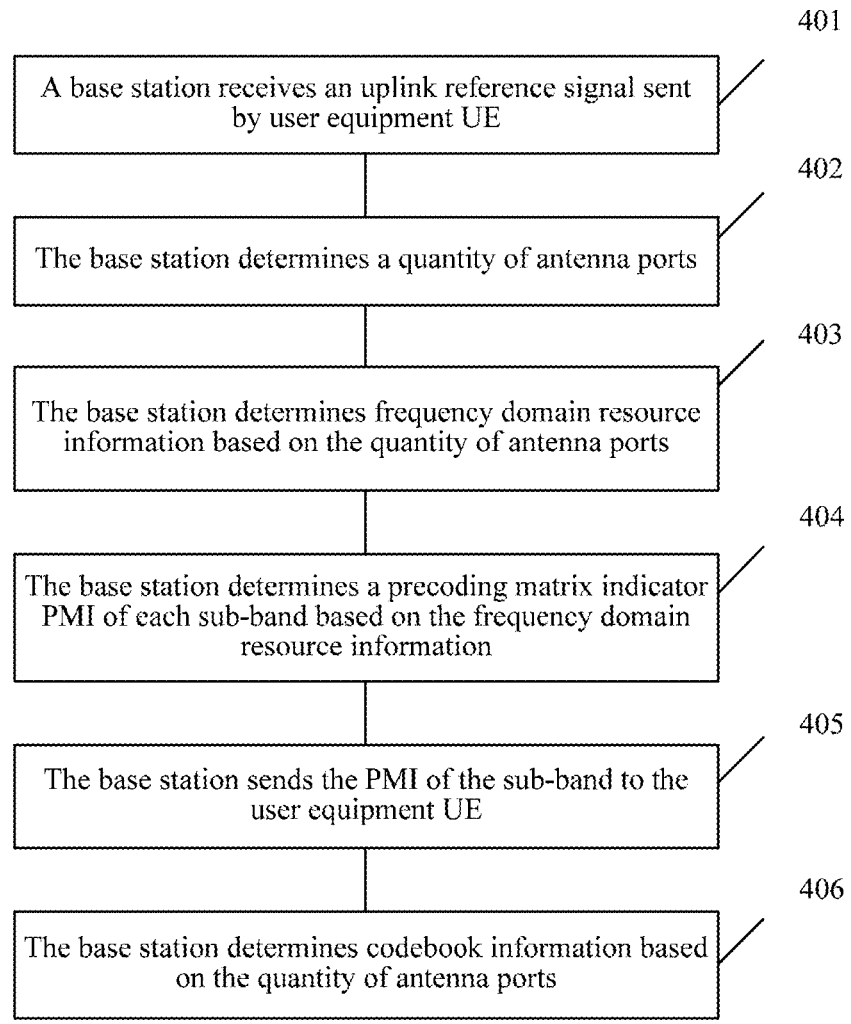
FIG. 4 is a schematic flowchart of a signaling sending method according to an embodiment of the present invention.

FIG. 4 shows a method embodiment of the present invention. The method embodiment includes the following steps.

Step 401. A base station receives an uplink reference signal sent by user equipment UE.

Step 402. The base station determines a quantity of antenna ports, where the quantity of antenna ports is a quantity of antenna ports used by the UE to send the uplink reference signal.

Step 402 may be before step 401. The base station may determine the quantity of antenna ports based on a capability of the UE. In this case, the base station may first receive capability indication information sent by the UE, and then determine the quantity of antenna ports based on the capability indication information. The base station may alternatively directly determine the quantity of antenna ports directly based on type information of the UE or a quantity of antenna ports that the base station currently allows the UE to use. In another embodiment, the base station may directly receive an uplink reference signal sent by the UE, and then determine the quantity of antenna ports based on the uplink reference signal.

Step 403. The base station determines frequency domain resource information based on the quantity of antenna ports, where the frequency domain resource information indicates at least one of a quantity of sub-bands and a sub-band bandwidth.

In an embodiment, the base station may determine or query a correspondence, where the correspondence may be a correspondence table indicating each correspondence between the quantity of antenna ports and the frequency domain resource information. Forms of the correspondence table and a bandwidth have been described by using an example in the foregoing embodiments. Details are not described herein again.

It should be understood that, the correspondence table may be an array stored in the base station. When the base station needs to determine a quantity of sub-bands corresponding to a quantity of antenna ports and/or the sub-band bandwidth, the base station may query corresponding storage space directly based on the quantity of antenna ports or an index corresponding to the quantity of antenna ports, and read the quantity of sub-bands corresponding to the antenna ports and/or the sub-band bandwidth. In another embodiment, when the array is queried, the array may alternatively be queried indirectly. For example, the quantity of sub-bands is determined based on a default total bandwidth and the sub-band bandwidth, and then the quantity of sub-bands and/or the sub-band bandwidth are determined through table lookup.

Step 404. The base station determines a precoding matrix indicator PMI of each sub-band based on the frequency domain resource information. In an embodiment, the base station further determines the precoding matrix based on the uplink reference signal. In some cases, the base station may alternatively determine, based on the historical information, that is, based on the frequency domain resource information, a PMI sub-band that needs to be fed back, and then determine the precoding matrix indicator PMI of the sub-band based on the historical information of the sub-band. The base station may further configure the PMI based on signaling of another network element.

Step 405. The base station sends the PMI of the sub-band to the user equipment UE.

In an embodiment, the base station sends at least two pieces of signaling to the UE at different moments, where each piece of signaling includes a PMI of at least one sub-band, and the base station sends the PMI of the sub-band to the UE through the at least two pieces of signaling. Optionally, the base station determines a time interval, and the base station sends the at least two pieces of signaling within the time interval. The implementation of sending the PMI of the at least one sub-band through the at least two pieces of signaling has been described in detail in FIG. 2, FIG. 3, and the foregoing related embodiment. Details are not described herein again.

In an embodiment, the method further includes step 406: The base station determines codebook information based on the quantity of antenna ports, where the codebook information is at least one of a quantity of code words, a quantity of bits occupied by the PMI of the sub-band, and a codebook, and the codebook is associated with the quantity of antenna ports. Step 404 of determining, by the base station, a precoding matrix indicator PMI of each sub-band based on the sub-band information includes: determining, by the base station, the precoding matrix indicator PMI of the sub-band based on the sub-band information and the codebook information. In an embodiment, the base station determines the frequency domain resource information based on a mapping relationship between the quantity of antenna ports and the codebook information. The determining, by the base station, the frequency domain resource information based on a mapping relationship between the quantity of antenna ports and the codebook information may be specifically querying a mapping table. A form of the mapping table may be specifically an array stored in the base station. When the base station needs to determine codebook information corresponding to a quantity of antenna ports, the base station may query corresponding storage space directly based on the quantity of antenna ports or an index corresponding to the quantity of antenna ports, and read the codebook information corresponding to the antenna ports. In another embodiment, when the array is queried, the array may alternatively be queried indirectly.

In an embodiment, the correspondence table may be a relationship table between the quantity of antenna ports and the frequency domain resource information and the codebook information. Provided that the base station determines the quantity of antenna ports, the base station may determine the frequency domain resource information and the codebook information.

In still another embodiment, the base station determines bits occupied by PMIs of all of the sub-bands, where when quantities of antenna ports are different, quantities of the occupied bits are the same. Corresponding to the foregoing mapping relationship table, the mapping relationship table may reflect a characteristic that quantities of the occupied bits are the same when quantities of antenna ports are different, because in some cases, a bit quantity of bits occupied when the quantity of antenna ports differs may be determined through the frequency domain resource information and the codebook information. For example, if it is determined that the frequency domain resource information is a quantity Kn of sub-bands, and determined that a quantity of bits of each of the PMIs for indicating the quantity of code words is Ln, a quantity of bits occupied by the feedback is a product of Kn and Ln. When the codebook is determined, a quantity of bits of each of the PMIs may be usually determined because the codebook has been determined.

In this case, step 405 may be specifically sending, by the base station, the PMI of the sub-band to the UE based on the occupied bits.

In still another embodiment, step 405 may be further sending, by the base station, at least two pieces of signaling to the UE at different moments, where each piece of signaling includes a PMI of at least one sub-band, and the base station sends the PMI of the sub-band to the UE through the at least two pieces of signaling. Optionally, the base station determines a time interval, and the base station sends the at least two pieces of signaling within the time interval. In this embodiment, an implementation of sending the PMIs through a plurality of pieces of signaling is specifically provided, and has been specifically described in the foregoing embodiments in FIG. 2 and FIG. 3. Details are not described herein again.

Through the solutions of the foregoing embodiments, a resource occupied by feedback of a PMI when antenna ports are different or sizes and quantities of sub-bands are different and antenna ports are different may be flexibly configured. Such configuration may flexibly adapt to a low-frequency scenario in which a small quantity of resources are occupied, and a high frequency scenario in which accuracy is ensured.

Figure 5:
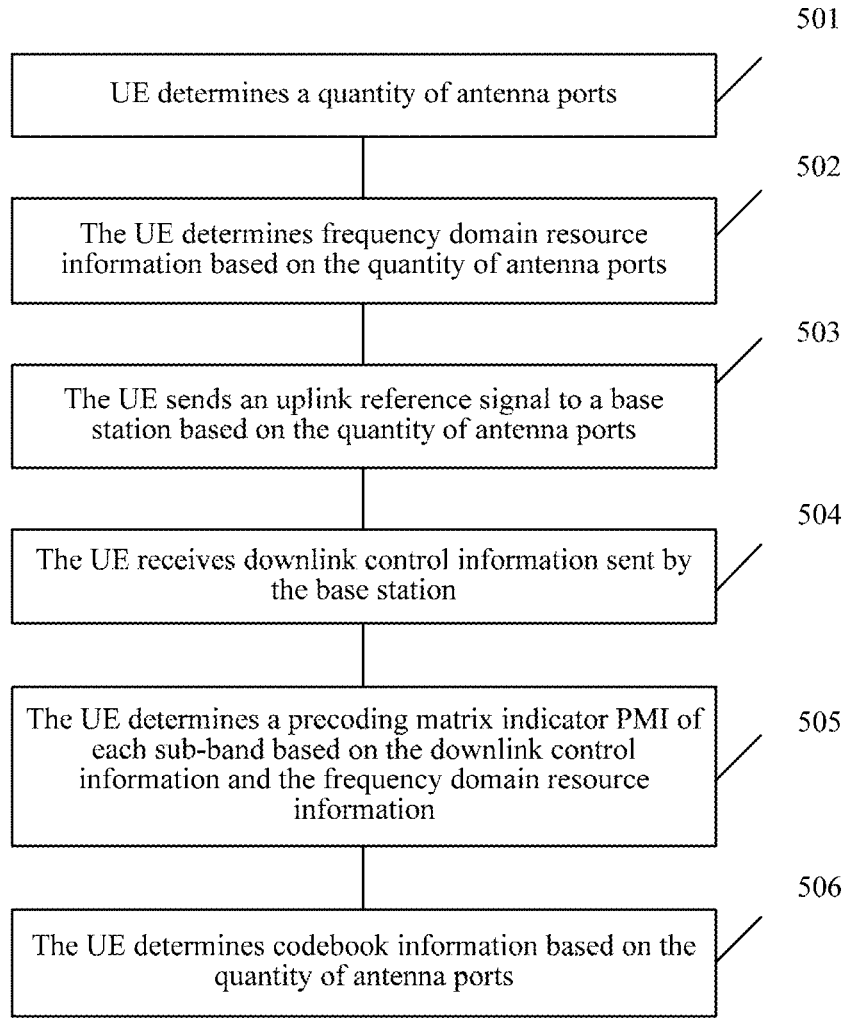
FIG. 5 is a schematic flowchart of a signaling sending method according to an embodiment of the present invention.

FIG. 5 shows another method embodiment of the present invention. The method embodiment includes the following steps.

Step 501. User equipment UE determines a quantity of antenna ports, where the quantity of antenna ports is a quantity of antenna ports used by the UE to send an uplink reference signal. The UE may determine the quantity of antenna ports based on a capability of the UE. To enable a base station to obtain the capability of the UE, the UE may send capability indication information to the base station. After sending the capability indication information, the UE may receive an indication of the base station, and determine the quantity of antenna ports based on the indication. The UE may alternatively directly determine the quantity of antenna ports directly based on the capability of the UE. An advantage of such a practice is signaling saving.

The UE may alternatively determine the quantity of antenna ports based on type information of the UE or a quantity of antenna ports that the base station currently allows the UE to use. In another embodiment, the UE may not perform step 501.

Step 502. The UE determines frequency domain resource information based on the quantity of antenna ports, where the frequency domain resource information indicates at least one of a quantity of sub-bands and a sub-band bandwidth. In an embodiment, the UE determines the frequency domain resource information based on a mapping relationship between the quantity of antenna ports and the frequency domain resource information. In an embodiment, the UE may determine the frequency domain resource information based on a mapping relationship table. The mapping relationship table may be stored in the UE. The mapping relationship table indicates each correspondence between the quantity of antenna ports and the frequency domain resource information. Forms of the correspondence table and a bandwidth have been described by using an example in the foregoing embodiments. Details are not described herein again.

It should be understood that, the correspondence table may be an array stored in the UE. When the UE needs to determine a quantity of sub-bands corresponding to a quantity of antenna ports and/or the sub-band bandwidth, the UE may query corresponding storage space directly based on the quantity of antenna ports or an index corresponding to the quantity of antenna ports, and read the quantity of sub-bands corresponding to the antenna ports and/or the sub-band bandwidth. In another embodiment, when the array is queried, the array may alternatively be queried indirectly. For example, the quantity of sub-bands is determined based on a default total bandwidth and the sub-band bandwidth, and then the quantity of sub-bands and/or the sub-band bandwidth are determined through table lookup.

Step 503. The UE sends the uplink reference signal to a base station based on the quantity of antenna ports. It should be understood that, an order relationship between step 503 and step 502 may be reversed.

Step 504. The UE receives downlink control information sent by the base station. In an embodiment, the UE determines bits occupied by PMIs of the sub-bands, where when quantities of antenna ports are different, quantities of the occupied bits are the same; and the UE specifically receives, based on the occupied bits, the downlink control information sent by the base station.

Step 505. The UE determines a precoding matrix indicator PMI of each sub-band based on the downlink control information and the frequency domain resource information.

In an embodiment, the method embodiment further includes step 506: The UE determines codebook information based on the quantity of antenna ports, where the codebook information is at least one of a quantity of code words, a quantity of bits occupied by the PMI of the sub-band, and a codebook, and the codebook is associated with the quantity of antenna ports; and the UE determines a precoding matrix of the sub-band based on the codebook information and the PMI of the sub-band.

In an embodiment, the UE determines the frequency domain resource information based on a mapping relationship between the quantity of antenna ports and the codebook information. The determining, by the UE, the frequency domain resource information based on a mapping relationship between the quantity of antenna ports and the codebook information may be specifically querying a mapping table. A form of the mapping table may be specifically an array stored in the UE. When the UE needs to determine codebook information corresponding to a quantity of antenna ports, the UE may query corresponding storage space directly based on the quantity of antenna ports or an index corresponding to the quantity of antenna ports, and read the codebook information corresponding to the antenna ports. In another embodiment, when the array is queried, the array may alternatively be queried indirectly.

In an embodiment, the correspondence table may be a relationship table between the quantity of antenna ports and the frequency domain resource information and the codebook information. Provided that the base station determines the quantity of antenna ports, the base station may determine the frequency domain resource information and the codebook information.

In still another embodiment, in step 504, the UE determines bits occupied by PMIs of all of the sub-bands, where when quantities of antenna ports are different, quantities of the occupied bits are the same. Corresponding to the foregoing mapping relationship table, the mapping relationship table may reflect a characteristic that quantities of the occupied bits are the same when quantities of antenna ports are different, because in some cases, a bit quantity of bits occupied when the quantity of antenna ports differs may be determined through the frequency domain resource information and the codebook information. For example, if the UE determines that the frequency domain resource information is a quantity Kn of sub-bands, and determines that the quantity of code words is Ln, a quantity of bits occupied by the receiving is a product of Kn and Ln. When the codebook is determined, a quantity of code words may be usually determined because the codebook has been determined.

In still another embodiment, the determining, by the UE, codebook information based on the quantity of antenna ports includes: determining, by the UE, the frequency domain resource information based on a mapping relationship between the quantity of antenna ports and the codebook information.

In still another embodiment, the UE receives, at different moments, at least two pieces of signaling sent by the base station, where each piece of signaling includes a PMI of at least one sub-band, and the UE obtains the PMI of the sub-band through the at least two pieces of received signaling. Optionally, the UE determines a time interval, and the UE receives the at least two pieces of signaling within the time interval. Optionally, the UE receives a time interval indication sent by the base station, where the time interval indication is used to indicate the time interval.

Based on the foregoing implementation, the UE determines the corresponding frequency domain resource information based on the quantity of antenna ports, and determines the PMI based on the frequency domain resource information, and the UE may flexibly configure, based on the capability of the UE or through negotiation with the base station, a resource occupied by feedback of a PMI when antenna ports are different or sizes and quantities of sub-bands are different and antenna ports are different. Such configuration may flexibly adapt to a low-frequency scenario in which a small quantity of resources are occupied, and a high frequency scenario in which accuracy is ensured.

It should be understood that, an order of performing steps in the method embodiment in FIG. 4 or FIG. 5 is not limited to being definite, and in many cases, some steps may be performed in a plurality of logical manners. Similarly, a same sub-module or physical apparatus has different roles and functions, and in the present invention, an execution order of implementing respective functions is not limited to being definite either. For example, step 401 may be after step 402. Before receiving the uplink reference signal, the base station determines the quantity of antenna ports, then notifies the quantity of antenna ports to the UE, and then receives the uplink reference signal. Alternatively, the base station may receive, directly based on a predefined rule, the uplink reference signal sent by the UE, and then determine the quantity of antenna ports based on the reference signal.

The embodiments shown in FIG. 4 and FIG. 5 may be used in combination with the foregoing embodiments.

Figure 6:
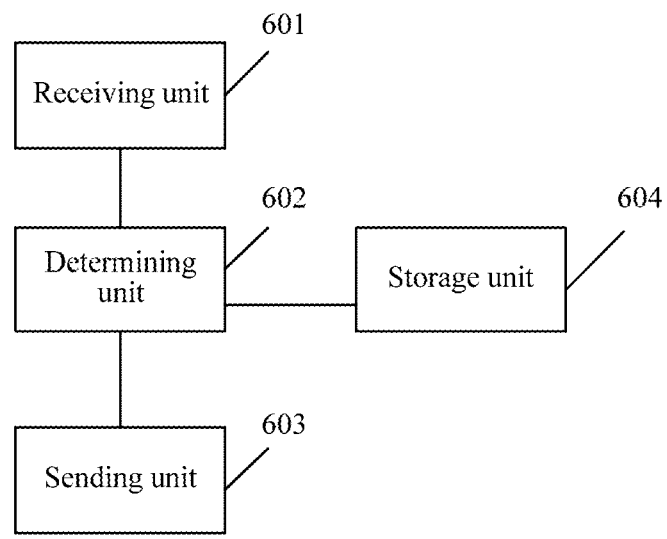
FIG. 6 is a structural diagram of a signaling sending apparatus according to an embodiment of the present invention.

FIG. 6 is a structural diagram of a network side device apparatus according to the present invention. Specifically, FIG. 6 may show a base station. The apparatus includes a receiving unit 601, a determining unit 602, and a sending unit 603. The receiving unit 601 is configured to receive an uplink reference signal sent by user equipment UE. The determining unit 602 is configured to determine a quantity of antenna ports, where the quantity of antenna ports is a quantity of antenna ports used by the UE to send the uplink reference signal. The determining unit 602 is configured to determine frequency domain resource information based on the quantity of antenna ports, where the frequency domain resource information indicates at least one of a quantity of sub-bands and a sub-band bandwidth. The determining unit 602 is configured to determine, by the base station, a precoding matrix indicator PMI of each sub-band based on the frequency domain resource information. The sending unit 603 is configured to send the PMI of the sub-band to the user equipment UE.

In FIG. 6, some related functions shown in the embodiment in FIG. 4 may be further independently performed. For example, the sending unit 603 is configured to send at least two pieces of signaling to the UE at different moments, where each piece of signaling includes a PMI of at least one sub-band, and the sending unit sends the PMI of the sub-band to the UE through the at least two pieces of signaling. In an embodiment, the determining unit 602 is configured to determine a time interval, and the base station sends the at least two pieces of signaling within the time interval. The sending unit 603 is configured to send a time interval indication to the UE, where the time interval indication is used to indicate the time interval.

The apparatus shown in FIG. 6 may implement related functions in FIG. 4, and may also implement various implementations in the foregoing embodiments. Details are not described herein again. In an embodiment, the apparatus further includes a storage unit 604, configured to store various correspondences, data, and signaling.

Figure 7:
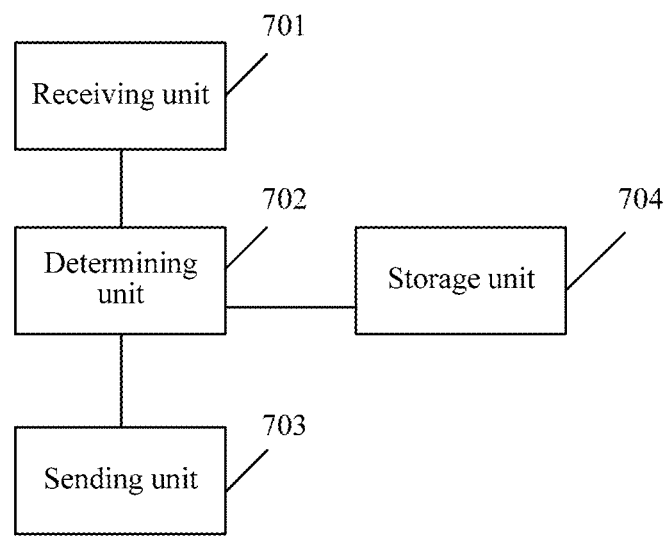
FIG. 7 is a structural diagram of a signaling sending apparatus according to an embodiment of the present invention.

FIG. 7 is a structural diagram of a network side device apparatus according to the present invention. Specifically, FIG. 7 may show user equipment. The apparatus includes a receiving unit 701, a determining unit 702, and a sending unit 703. The determining unit 702 is configured to determine a quantity of antenna ports, where the quantity of antenna ports is a quantity of antenna ports used by the UE to send an uplink reference signal. The determining unit 702 is configured to determine frequency domain resource information based on the quantity of antenna ports, where the frequency domain resource information indicates at least one of a quantity of sub-bands and a sub-band bandwidth. The sending unit 703 is configured to send the uplink reference signal to a base station based on the quantity of antenna ports and the frequency domain resource information. The receiving unit 701 is configured to receive downlink control information sent by the base station. The determining unit 702 is further configured to determine a precoding matrix indicator PMI of each sub-band based on the downlink control information and the frequency domain resource information.

In FIG. 7, some related functions shown in the embodiment in FIG. 5 may be further independently performed. The receiving unit 701 is configured to receive, at different moments, at least two pieces of signaling sent by the base station, where each piece of signaling includes a PMI of at least one sub-band, and the receiving unit obtains the PMI of the sub-band through the at least two pieces of received signaling. The determining unit 702 is configured to determine a time interval, and the receiving unit receives the at least two pieces of signaling within the time interval.

The apparatus shown in FIG. 7 may implement related functions in FIG. 5, and may also implement various implementations in the foregoing embodiments. Details are not described herein again. In an embodiment, the apparatus further includes a storage unit 704, configured to store various correspondences, data, and signaling.

Figure 8:
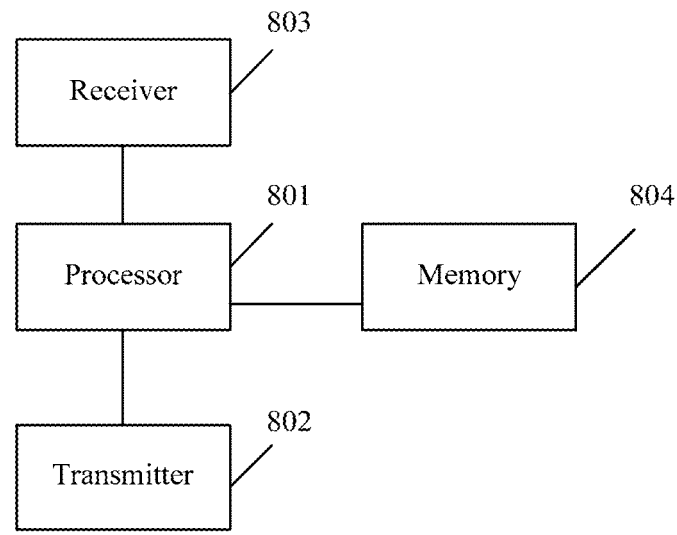
FIG. 8 is a structural diagram of a signaling sending apparatus according to an embodiment of the present invention.

FIG. 8 is a structural diagram of another network side apparatus according to the present invention. FIG. 8 may show a base station. The apparatus includes a processor 801, a transmitter 802, and a receiver 803, so as to implement functions of each embodiment in FIG. 4 and/or FIG. 6, and may also implement various implementations in the foregoing embodiments. For example, the processor completes a role of a determining unit, the receiver completes a role of a receiving unit, and the transmitter completes a role of a sending unit. In an embodiment, the processor may be connected to a storage 804, configured to store code and data for performing the method embodiment shown in FIG. 4, and the processor 902 completes a calculation or determining step. The receiver and the transmitter may be a transceiver apparatus such as an antenna apparatus or an antenna system.

Figure 9:
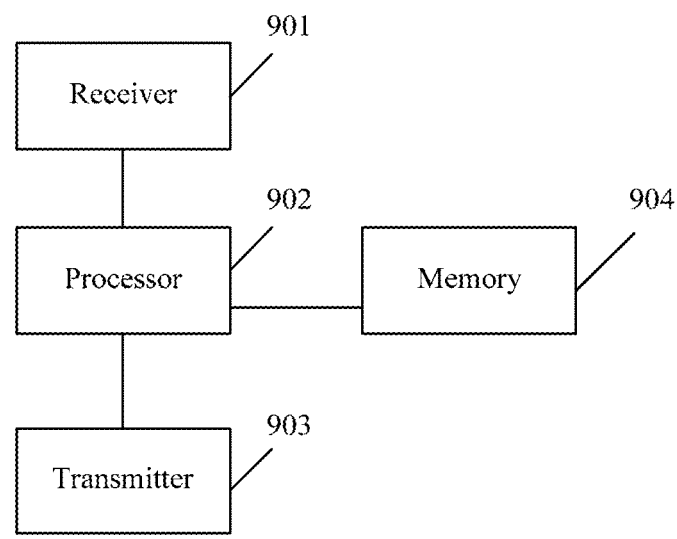
FIG. 9 is a structural diagram of a signaling sending apparatus according to an embodiment of the present invention.

FIG. 9 is a structural diagram of a user equipment apparatus according to the present invention. FIG. 9 may show user equipment. The apparatus includes a receiver 901, a processor 902, and a transmitter 903, so as to implement related functions in FIG. 5 and/or FIG. 7, and may also implement various implementations in the foregoing embodiments. For example, the processor completes a role of a determining unit, the receiver completes a role of a receiving unit, and the transmitter completes a role of a sending unit. In an embodiment, the processor may be connected to a storage 904, configured to store code and data for performing the method embodiment shown in FIG. 5, and the processor 902 completes a calculation or determining step. The receiver and the transmitter may be a transceiver apparatus such as an antenna apparatus or an antenna system.

It should be understood that, the receiver and the transmitter in FIG. 8 may be a pair of transmit and receive antennas, or may be an antenna or panel array that simultaneously implements transmit and receive functions, and the receiver and the transmitter in FIG. 9 may also be a pair of transmit and receive antennas, or may be an antenna or panel array that simultaneously implements transmit and receive functions. In an embodiment, the processor may implement a function of the determining unit in FIG. 8, the transmitter may implement a function of the sending unit in FIG. 8, and the receiver may implement a function of the receiving unit in FIG. 8. The receiver and the transmitter may be a transceiver apparatus such as an antenna apparatus or an antenna system.

Figure 10:
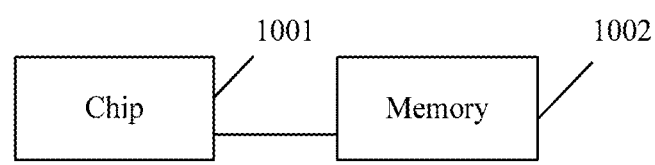
FIG. 10 is a structural diagram of a signaling sending chip system according to an embodiment of the present invention.

FIG. 10 shows still another implementation of the present invention, and FIG. 10 shows an integrated circuit system. The integrated circuit system includes a chip 1001 and a storage 1002, where the chip and the storage are soldered onto a circuit board, and the circuit board is located on a network side or a user equipment side. The chip storage 1002 is linked to the chip 1001 through a wire of the integrated circuit, and the chip reads or stores calculated data and an instruction through the link to the storage. The chip is in contact and communication with a contact point of the integrated circuit, and is linked to another chip, a connector, or an antenna through a wire, and is configured to transmit or receive the data and the instruction, and a specific linking manner may be various high-speed or low-speed interfaces. The chip may be a chip having an X86 instruction set, an advanced reduced instruction set computer machine (advanced RISC machine, ARM) instruction set, or another instruction set, or may be a logical chip such as a field programmable gate array (field programmable gate array, FPGA). The storage may be a memory, a hard disk, an erasable FLASH chip, or the like. The integrated circuit system may implement functions of data receiving, data sending, and data processing. For example, when the integrated circuit system is located on a network side, the steps shown in FIG. 4 may be implemented. The chip receives an uplink reference signal sent by user equipment UE; the chip determines a quantity of antenna ports, where the quantity of antenna ports is a quantity of antenna ports used by the UE to send the uplink reference signal; the chip determines frequency domain resource information based on the quantity of antenna ports, where the frequency domain resource information indicates at least one of a quantity of sub-bands and a sub-band bandwidth; the chip determines a precoding matrix indicator PMI of each sub-band based on the frequency domain resource information; and the chip sends the PMI of the sub-band to the user equipment UE. Specific calculation of the chip may be invoking the instruction and the data from the storage, for example, invoking a calculation manner, and a pre-stored relationship between a quantity of antenna ports and frequency domain resource information, and/or a pre-stored relationship between the quantity of antenna ports and the codebook information. The base station may perform a necessary operation of addition, subtraction, multiplication, or division through a gate circuit, and another logical operation to determine the precoding matrix indicator PMI of the sub-band based on the frequency domain resource information, then send, through an interface, the PMI to another element that needs to perform processing, and finally send the PMI to a terminal device. When the integrated circuit system is located on a terminal side, the steps shown in FIG. 5 may be implemented.

In still another embodiment of the present invention, a computer device may include a storage, a processor, and a computer program that is stored in the storage and that may be run on the processor, where when the processor executes the program, the steps in FIG. 2 to FIG. 9 may be implemented. A specific implementation of the computer device may be further implemented with reference to the manner in FIG. 10.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, DVD), a semiconductor medium (for example, a solid-state drive Solid State Disk (SSD)), or the like. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signaling transmission method, comprising:
   determining, by user equipment (UE), a quantity of antenna ports, wherein the quantity of antenna ports is a quantity of antenna ports used by the UE to send an uplink reference signal;
   determining, by the UE, frequency domain resource information based on the quantity of antenna ports, wherein the frequency domain resource information indicates at least one of sub-band quantity of a plurality of sub-bands or a sub-band bandwidth;
   sending, by the UE, the uplink reference signal to a base station based on the quantity of antenna ports;
   receiving, by the UE, downlink control information sent by the base station; and
   determining, by the UE, a precoding matrix indicator (PMI) of each sub-band of the plurality of sub-bands based on the downlink control information sent by the base station and the frequency domain resource information determined by the UE.

2. The method according to claim 1, wherein the UE determines codebook information based on the quantity of antenna ports, wherein the codebook information comprises at least one of a quantity of code words, a quantity of bits occupied by the PMI of the sub-band, or a codebook, and wherein the codebook is associated with the quantity of antenna ports; and
   wherein the UE determines a precoding matrix of the sub-band based on the codebook information and the PMI of the sub-band.

3. The method according to claim 2, wherein the determining, by the UE, codebook information based on the quantity of antenna ports comprises:
   determining, by the UE, the frequency domain resource information based on a mapping relationship between the quantity of antenna ports and the codebook information.

4. The method according to claim 1, wherein the receiving, by the UE, downlink control information sent by the base station comprises:
   determining, by the UE, bits occupied by PMIs of all of the sub-bands, wherein for different quantity of antenna ports, quantities of the occupied bits are the same; and
   receiving, by the UE and based on the occupied bits, the downlink control information sent by the base station.

5. The method according to claim 1, wherein the receiving, by the UE, downlink control information sent by the base station comprises:
   receiving, by the UE at different moments, at least two pieces of signaling sent by the base station, wherein each piece of signaling comprises a PMI of at least one sub-band, and wherein the UE obtains the PMI of the sub-band through the at least two pieces of received signaling.

6. The method according to claim 5, wherein the UE determines a time interval, and wherein the UE receives the at least two pieces of signaling within the time interval.

7. The method according to claim 6, wherein the UE receives a time interval indication sent by the base station, and wherein the time interval indication is used to indicate the time interval.

8. The method according to claim 1, wherein the determining, by the UE, frequency domain resource information based on the quantity of antenna ports comprises:
   determining, by the UE, the frequency domain resource information based on a mapping relationship between the quantity of antenna ports and the frequency domain resource information.

9. A base station, comprising:
   a receiver, the receiver configured to receive an uplink reference signal sent by user equipment (UE);
   at least one processor;
   one or more memories coupled to the at least one processor and storing programming instructions for execution by the at least one processor to:
      determine a quantity of antenna ports, wherein the quantity of antenna ports is a quantity of antenna ports used by the UE to send the uplink reference signal;
      determine frequency domain resource information based on the quantity of antenna ports, wherein the frequency domain resource information indicates at least one of sub-band quantity of a plurality of sub-bands or a sub-band bandwidth; and
      determine a precoding matrix indicator (PMI) of each sub-band of the plurality of sub-bands based on the frequency domain resource information; and
   a transmitter, the transmitter configured to send the PMI of the sub-band to the UE.

10. The base station according to claim 9, wherein the programming instructions are for execution by the at least one processor to:
    determine codebook information based on the quantity of antenna ports, wherein the codebook information comprises at least one of a quantity of code words, a quantity of bits occupied by the PMI of the sub-band, or a codebook, and wherein the codebook is associated with the quantity of antenna ports; and
    wherein determining a precoding matrix indicator (PMI) of each sub-band based on the frequency domain resource information comprises:
       determining the PMI of the sub-band based on the frequency domain resource information and the codebook information.

11. The base station according to claim 10, wherein determining codebook information based on the quantity of antenna ports comprises:
    determining the frequency domain resource information based on a mapping relationship between the quantity of antenna ports and the codebook information.

12. The base station according to claim 11, wherein the programming instructions are for execution by the at least one processor to determine bits occupied by PMIs of all of the sub-bands, and wherein for different quantity of antenna ports, quantities of the occupied bits are the same; and wherein sending the PMI of the sub-band to the UE comprises sending the PMI of the sub-band to the UE based on the occupied bits.

13. User equipment (UE), comprising:
   at least one processor;
   one or more memories coupled to the at least one processor and storing programming instructions for execution by the at least one processor to:
      determine a quantity of antenna ports, wherein the quantity of antenna ports is a quantity of antenna ports used by the UE to send an uplink reference signal; and
      determine frequency domain resource information based on the quantity of antenna ports, wherein the frequency domain resource information indicates at least one of sub-band quantity of a plurality of sub-bands or a sub-band bandwidth;
   a transmitter, the transmitter configured to send the uplink reference signal to a base station based on the quantity of antenna ports and the frequency domain resource information; and
   a receiver, the receiver configured to receive downlink control information sent by the base station, wherein the programming instructions are for execution by the at least one processor to determine a precoding matrix indicator (PMI) of each sub-band of the plurality of sub-bands based on the downlink control information sent by the base station and the frequency domain resource information determined by the UE.

14. The UE according to claim 13, wherein the programming instructions are for execution by the at least one processor to:
   determine codebook information based on the quantity of antenna ports, wherein the codebook information comprises at least one of a quantity of code words, a quantity of bits occupied by the PMI of the sub-band, or a codebook, and wherein the codebook is associated with the quantity of antenna ports; and
   determine a precoding matrix of the sub-band based on the codebook information and the PMI of the sub-band.

15. The UE according to claim 14, wherein determining codebook information based on the quantity of antenna ports comprises:
   determining the frequency domain resource information based on a mapping relationship between the quantity of antenna ports and the codebook information.

16. The UE according to claim 13, wherein the programming instructions are for execution by the at least one processor to determine bits occupied by PMIs of all of the sub-bands, wherein for different quantity of antenna ports, quantities of the occupied bits are the same; and
   wherein receiving downlink control information sent by the base station comprises receiving, based on the occupied bits, the downlink control information sent by the base station.

17. The UE according to claim 13, wherein receiving, by the UE, downlink control information sent by the base station comprises:
   receiving, at different moments, at least two pieces of signaling sent by the base station, wherein each piece of signaling comprises a PMI of at least one sub-band; and
   obtaining the PMI of the sub-band through the at least two pieces of received signaling.

18. The UE according to claim 17, wherein the programming instructions are for execution by the at least one processor to determine a time interval, and wherein the receiver is configured to receive the at least two pieces of signaling within the time interval.

19. The UE according to claim 18, wherein the receiver is configured to receive a time interval indication sent by the base station, and wherein the time interval indication is used to indicate the time interval.

20. The UE according to claim 13, wherein determining frequency domain resource information based on the quantity of antenna ports comprises:
   determining the frequency domain resource information based on a mapping relationship between the quantity of antenna ports and the frequency domain resource information.

* * * * *